Jan. 14, 1958  T. W. PODGAJNY  2,819,685
RAILWAY MOTOR TRUCK STRUCTURE
Filed Aug. 25, 1954  3 Sheets-Sheet 1

INVENTOR.
Thaddeus W. Podgajny
BY Rodney Bedell
atty

Jan. 14, 1958 T. W. PODGAJNY 2,819,685
RAILWAY MOTOR TRUCK STRUCTURE
Filed Aug. 25, 1954 3 Sheets-Sheet 2

INVENTOR.
Thaddeus W. Podgajny
BY Rodney Bedell
atty.

Jan. 14, 1958     T. W. PODGAJNY     2,819,685
RAILWAY MOTOR TRUCK STRUCTURE
Filed Aug. 25, 1954     3 Sheets-Sheet 3

INVENTOR.
Thaddeus W. Podgajny
BY Rodney Bedell
atty.

United States Patent Office 2,819,685
Patented Jan. 14, 1958

2,819,685
RAILWAY MOTOR TRUCK STRUCTURE

Thaddeus W. Podgajny, Wilmington, Del., assignor to General Steel Castings Corporation, Granite City, Ill., a corporation of Delaware Application August 25, 1954, Serial No. 452,160

10 Claims. (Cl. 105—196)

The invention relates to railway rolling stock and more particularly to the support of the housing of a driving motor in a truck having three or more axles which move relative to each other transversely of the truck when the truck is on curved track. In some three axle motor trucks the wheels on the end axles only are flanged to engage the sides of the track rail heads, but the wheels on the middle axle are flangeless so that the wheels may slide transversely across the rails on curved track without requiring the middle axle to move transversely of the truck frame or relative to the other axles. In such trucks, since the relation between the middle axle and the truck frame transversely of the truck does not change materially when the truck is on curved track, the fact that the middle axle is provided with a motor supported in part on the truck frame does not create a problem arising out of the frame support of the motors, but there is a resulting high lateral rail stress because the wheels must be slid across the rail when the truck is rounding a curve.

The main object of the present invention is to utilize flanged wheels on the middle axle of a three axle truck, allowing the axle to move transversely of the truck frame and the other axles, but supporting the motor housing on the truck frame so that the motor housing can shift transversely of the frame with the axle and without there being any substantial resistance to such movement.

This and other detailed objects of the invention are attained by the structure illustrated in the accompanying drawings, in which.

Figure 1:
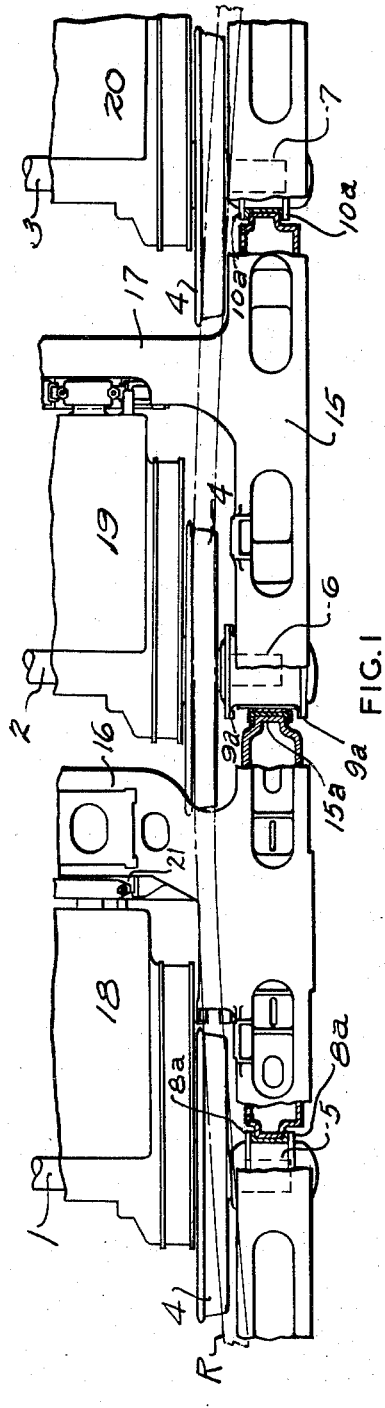
Figure 1 is a top view of one longitudinal half of a truck frame of the class described mounted on curved track with the middle axle offset transversely of the end axles, and of the truck frame, from the position it would occupy if the truck were on straight track.
Figure 2:
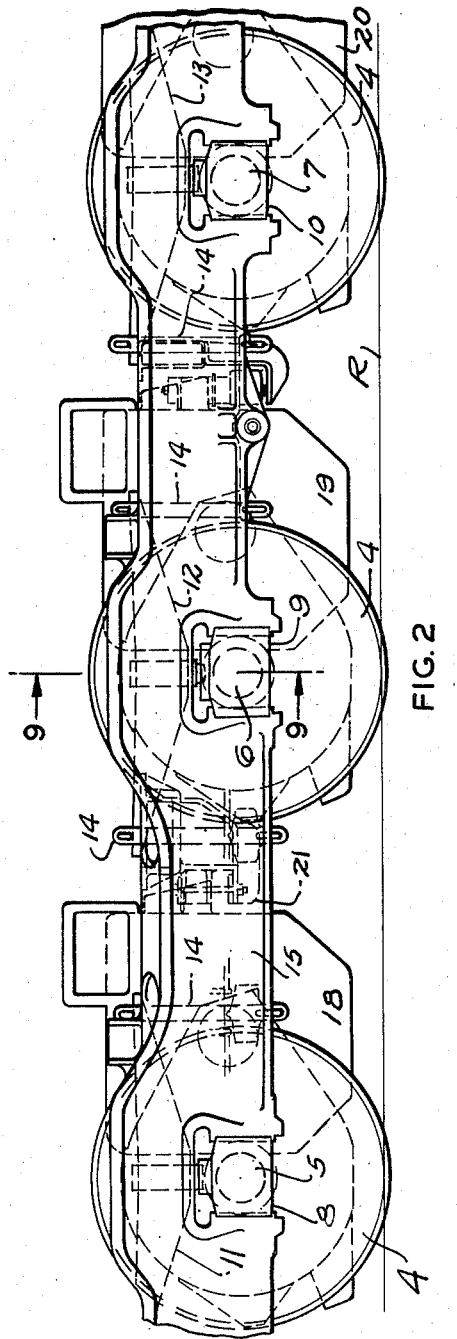
Figure 2 is a side elevation of the structure shown in Figure 1.
Figure 3:
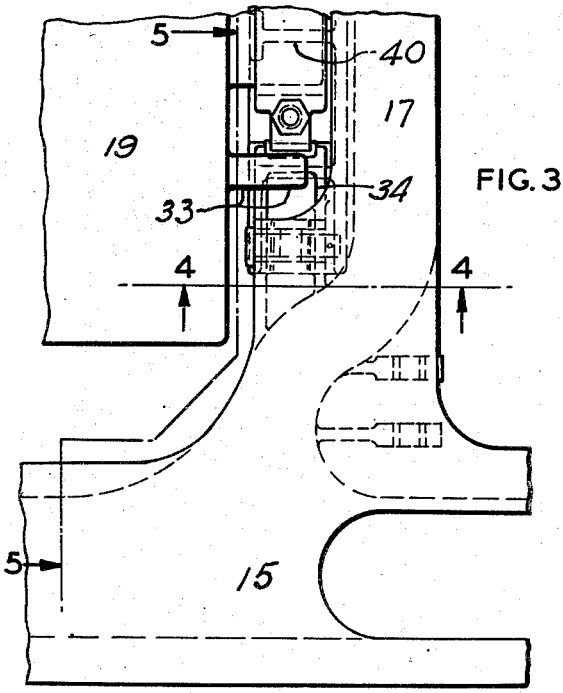
Figure 3 is a horizontal view drawn to an enlarged scale showing the right hand transom in Figure 1 and the support for the adjacent end of the motor housing.
Figure 4:
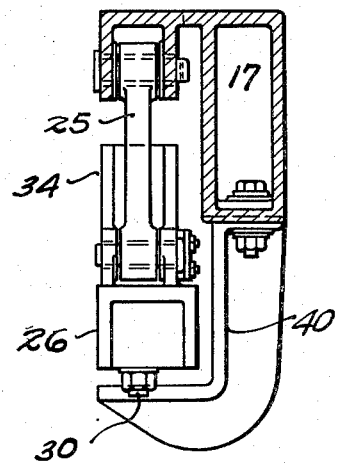
Figure 4 is a vertical longitudinal detail section taken on the line 4—4 of Figure 3.
Figure 5:
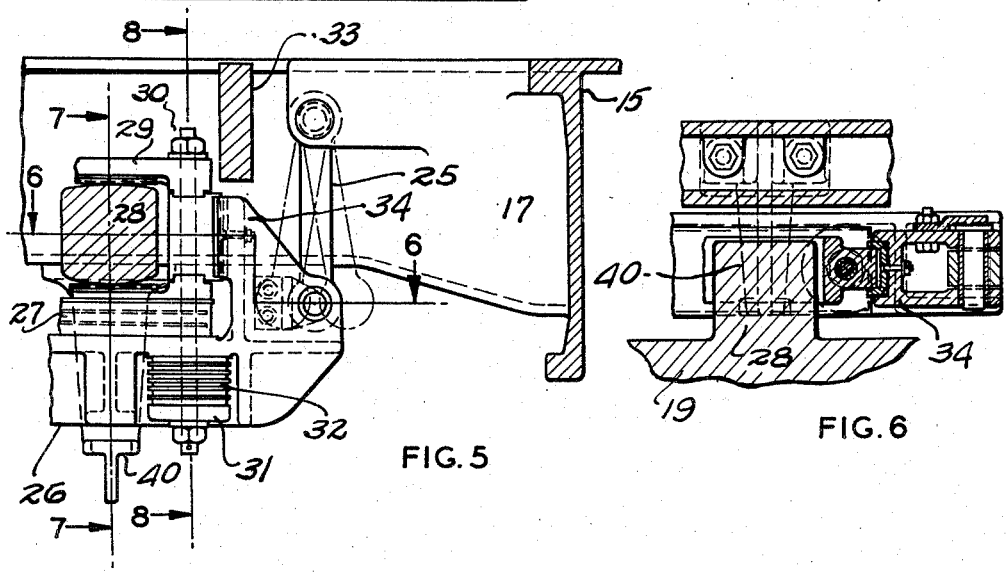
Figure 5 is a vertical and transverse section taken on the line 5—5 of Figure 3.
Figure 6:
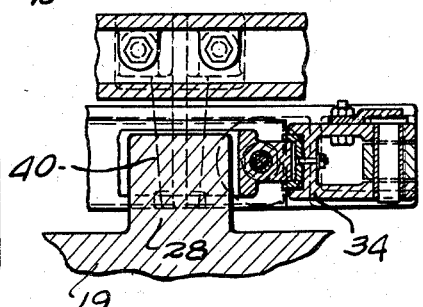
Figure 6 is a detail horizontal section taken on the line 6—6 of Figure 5.
Figure 7:
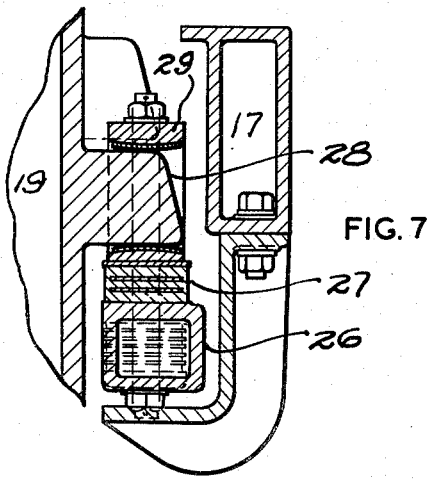
Figure 7 is a detail vertical longitudinal section taken on the line 7—7 of Figure 5.
Figure 8:
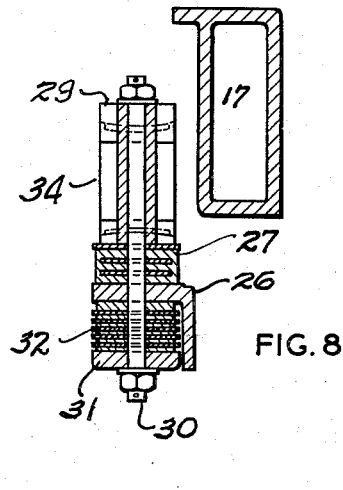
Figure 8 is a detail vertical longitudinal section taken on the line 8—8 of Figure 5.

The truck comprises three axles 1, 2, 3 provided with flanged wheels 4 at their ends and terminating in journals 5, 6, 7 mounting boxes 8, 9, 10, respectively.

Seated on the journal boxes are leaf springs 11, 12, and 13, respectively. Hangers 14, suspended from the springs, support the truck frame which preferably consists of a rigid one-piece casting with side members or wheel pieces 15 and spaced transverse transoms, two of which are shown at 16 and 17.

The axles are driven by motors having housings 18, 19, and 20, respectively, and each housing is supported near one end on the associated axle and near its opposite end upon an associated truck frame transom. The axle supported end of each housing extends substantially from wheel hub to wheel hub and is thereby positioned against movement relative to the axle lengthwise of the axle. The frame supported ends of motor housings 18 and 20 are mounted upon brackets 21 on the frame transoms. If the frame pedestal jaws receiving the journal boxes 8 and 10 have vertically sliding fits in these boxes, the frames are held against substantial movement lengthwise of the axles and there will be no relative transverse movement of the motor housing supporting elements on the axle and on the frame.

Figure 9:
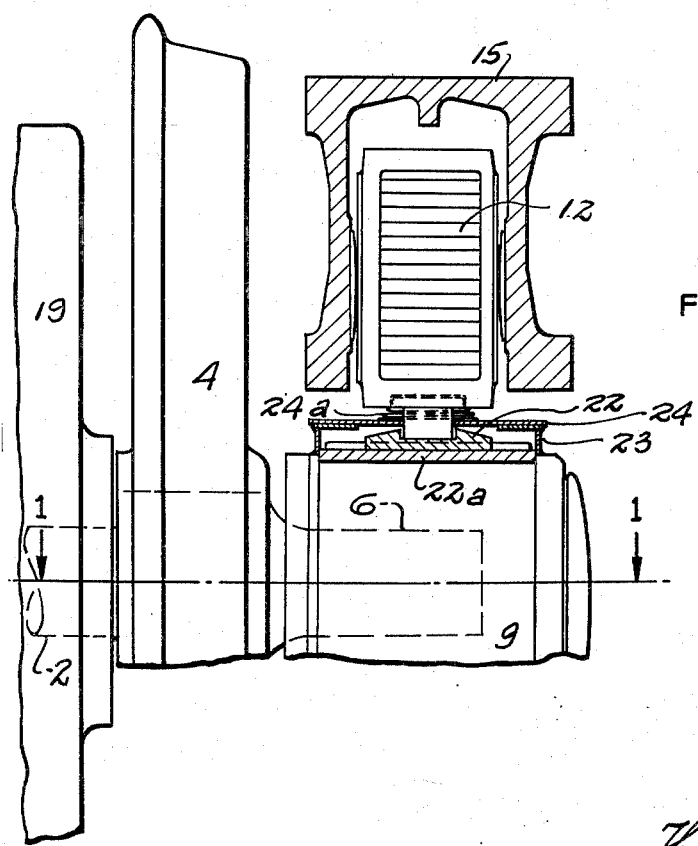
Figure 9 is a detail vertical transverse section taken on the line 9—9 of Figure 2.

As indicated in Figure 1, to an exaggerated extent to better illustrate the action being described, the engagement of the wheel flanges by the head of rail R will result in the offsetting of middle axle 2 from end axles 1 and 3 and from the adjacent portion of the frame. To accommodate this offsetting, a steel saddle 22 for spring 12 on middle journal box 9 slides transversely of the truck on the bronze plate 22a mounted on top of the box (Figure 9). The plate structure 23 is welded to the top of the box to form a receptacle for a lubricant, and a closure plate 24 slides with saddle 22 and is held in engagement with plate structure 23 by springs 24a.

The journal box flanges 9a Figure 1 of middle box 9 are spaced from the middle pedestal legs 15a to provide for lateral movement between the box and the frame. The journal box flanges 8a and 10a of boxes 8 and 10 do not permit any substantial lateral movement relative to the pedestals 15a.

To compensate for the resulting movement between the frame and the middle motor housing 19, there is provided a lateral motion support comprising swing hangers 25 pivotally suspended from transom 17 with their lower ends mounting a swing beam 26. Rubber pads 27, carried on beam 26, support the motor nose 28. A holddown bar 29 extends across the top of the motor nose and vertical bolts 30, at its ends, extend downwardly at the sides of the motor nose and through beam 26 and are seated at 31 against rubber pads 32 to hold the motor nose against movement upwardly from beam 26.

The motor has safety lugs 33 overlying the upstanding ends 34 of swing beam 26. A bracket 40 is bolted to the bottom of transom 17 and extends downwardly from the transom and outwardly therefrom to underlie beam 26 and afford a support therefor in the event of failure of one of the hangers 25 or its pivot pin.

With this arrangement, the motor housing may swing transversely of the truck to accommodate movement of the motor and axle 2 relative to the frame transversely of the truck.

Any movement by swing hangers 25 will result in a lifting of the swing beam so that the hangers act as a centering device for the wheel and axle assembly, the beam, and the motor housing and assist the wheel flanges to promptly return them to a central position when the truck moves out of the curved track and onto tangent track.

With this arrangement, the middle axle 2, its wheels, journal boxes 9, and motor housing 19 may move approximately four inches in a direction transversely of the truck, which is adequate to accommodate the curvature of the rail between the wheels of the end axles 1 and 3.

The parts shown include sufficient structure to accommoderate lateral tilting of the truck frame due to action of the truck springs and track irregularities, and the yielding and swinging elements avoid the necessity of overcoming friction to effect the relative lateral movement of the motor housing and truck frame.

The details of the structure may be varied substantially to produce similar results without departing from the spirit of the invention and the exclusive use of the modifications of the illustrated structure coming within the scope of the claims is contemplated.

What is claimed is:

1. In a railway truck, three axles with wheels, a rigid truck frame mounted thereon, means holding the end axles against substantial play transversely of the truck frame, the middle axle having substantial movement transversely of the truck frame, an individual driving motor carried in part by and operatively associated with each axle and provided with a housing held against movement lengthwise of the associated axle and including a part spaced from the axle lengthwise of the truck, and a support for the spaced end on the truck frame, the support of the middle axle motor housing only on the truck frame being movable transversely of the frame to accommodate substantial movement of the middle axle transversely of the truck.

2. In a railway truck, three axles, flanged wheels on each axle, a rigid truck frame mounted on said axles, the end axles having only restricted play transversely of the truck frame while the middle axle has substantially greater play transversely of the truck frame to accommodate shifting of the end axles relative to the middle axle laterally of the truck when the truck is on curved track, a motor associated with each axle and movable with the axle transversely of the truck frame and including a housing projecting from the axle lengthwise of the truck and having a support at its projected end on the truck frame, the support of the projected end of the middle motor housing on the truck frame being movable transversely of the frame to accommodate the substantial movement of the middle axle relative to the truck frame on curved track.

3. In a railway truck, three axles with wheels, the wheels on each axle having flanged rims to restrict the movement of the wheels transversely of the rails, journal boxes on said axles, a truck frame supported on said journal boxes and having depending pairs of pedestal legs, each pair of legs receiving between them a corresponding journal box and the legs receiving the journal boxes of the end axles fitting in grooves therein to limit relative movement of the frame and journal boxes transversely of the truck, the legs receiving the journal boxes of the middle axle and the bearing of the frame on the boxes providing for the relative movement of the frame and the boxes transversely of the truck, a motor operatively associated with the middle axle and including a housing extending lengthwise of the truck and having a support at one end on the axle and at its other end on the truck frame, the support on the truck frame having movement on the frame transversely of the frame to accommodate the shifting of the middle axle, wheels, and journal boxes relative to the frame and end wheels, axles, and journal boxes when the truck is on curved track.

4. In combination, a railway truck having a wheeled axle, a truck frame supported in part on said axle, said axle and frame being movable substantially relative to each other lengthwise of the axle, a motor including a housing supported in part on said axle and projecting therefrom longitudinally of the truck, and a device for supporting the projected end of said housing and supported from the truck frame and being movable with the housing and the axle transversely of the truck frame.

5. In combination, a railway truck having a wheeled axle, a truck frame supported in part on said axle, said axle and frame being movable substantially relative to each other lengthwise of the axle, a motor including a housing supported in part on said axle and projecting therefrom longitudinally of the truck, and a link pivotally suspended from the truck frame to swing transversely of the frame with its lower portion providing a support for the projecting part of the motor housing and accommodating the movement of the supported portion of the housing with the axle.

6. In combination, a railway truck having a wheeled axle, a truck frame supported in part on said axle and including a transverse transom, said axle and frame being movable substantially relative to each other lengthwise of the axle, a motor including a housing supported in part on said axle and projecting therefrom longitudinally of the truck, and a pair of upright links spaced apart lengthwise of the transom and pivotally supported at their upper ends from the transom, a carrier extending between and mounted on the swinging portions of said links, and a yielding support on said carrier for the projected end of the motor housing.

7. A truck and motor structure as described in claim 6 in which a holddown member extends over the projected end of the motor housing, there being a connection between said holddown member and said carrier limiting their movement away from each other.

8. A truck and motor structure as described in claim 6, there being a holddown bar extending over the projected end of the motor and parallel to said carrier, elongated elements extending downwardly from the ends of said holddown bar and provided with flexible seats against downwardly facing portions of the carrier.

9. In combination with a railway truck frame and a wheeled axle upon which the frame is supported in part so as to move lengthwise of the axle, a frame transom substantially parallel to the axle but spaced therefrom transversely of the axle, links pivotally suspended from the transom at points spaced apart lengthwise of the transom so as to swing lengthwise of the transom, a carrier mounted upon the lower ends of said links, a motor housing supported in part on said axle and in part on said carrier and movable with the axle and the swinging of said links parallel to the transom, and a safety support rigid with the transom and projecting under the adjacent end of the motor housing and the swinging carrier.

10. In combination with a railway truck frame and a wheeled axle upon which the frame is supported in part so as to move lengthwise of the axle, a frame transom substantially parallel to the axle but spaced therefrom transversely of the axle, links pivotally suspended from the transom at points spaced apart lengthwise of the transom so as to swing lengthwise of the transom, a carrier mounted upon the lower ends of said links, and a motor housing supported in part on said axle and in part on said carrier and movable with the axle and the swinging of said links parallel to the transom.

References Cited in the file of this patent

UNITED STATES PATENTS

| | | |
|---|---|---|
| 799,264 | Priest | Sept. 12, 1905 |
| 902,017 | Stowe | Oct. 27, 1908 |
| 1,723,720 | Buchli | Aug. 6, 1929 |
| 2,299,560 | Travilla | Oct. 20, 1942 |
| 2,632,405 | Ivatt | Mar. 24, 1953 |